(12) United States Patent
Miller et al.

(10) Patent No.: US 9,156,364 B2
(45) Date of Patent: Oct. 13, 2015

(54) WIRELESS POWER CHARGING USING POINT OF LOAD CONTROLLED HIGH FREQUENCY POWER CONVERTERS

(71) Applicant: UT-Battelle, LLC, Oak Ridge, TN (US)

(72) Inventors: John M. Miller, Oak Ridge, TN (US); Steven L. Campbell, Oliver Springs, TN (US); Paul H. Chambon, Knoxville, TN (US); Larry E. Seiber, Oak Ridge, TN (US); Clifford P. White, Seymour, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 358 days.

(21) Appl. No.: 13/739,198

(22) Filed: Jan. 11, 2013

(65) Prior Publication Data
US 2013/0214591 A1 Aug. 22, 2013

Related U.S. Application Data

(60) Provisional application No. 61/598,387, filed on Feb. 14, 2012.

(51) Int. Cl.
*B60L 11/18* (2006.01)
*H02J 17/00* (2006.01)
(Continued)

(52) U.S. Cl.
CPC ............. *B60L 11/182* (2013.01); *H02J 5/005* (2013.01); *H02J 7/025* (2013.01); *H02J 17/00* (2013.01); *Y02T 10/7005* (2013.01); *Y02T 90/122* (2013.01); *Y02T 90/14* (2013.01)

(58) Field of Classification Search
CPC ... B60L 11/182; H02J 13/0024; H02J 15/005; H02J 7/025; H02M 2001/008

USPC .................................................. 307/104, 9.1
See application file for complete search history.

(56) References Cited

U.S. PATENT DOCUMENTS 5,500,791 A * 3/1996 Kheraluwala et al. .......... 363/17
7,923,866 B2    4/2011 Ichikawa et al.
(Continued)

FOREIGN PATENT DOCUMENTS

RU           2354026 C1       4/2009
WO    WO 2004044959 A2 *    5/2004

OTHER PUBLICATIONS

U.S. Appl. No. 13/484,404, filed May 31, 2012, titled "Regulation Control and Energy Management Scheme for Wireless Power Transfer", First Named Inventor: John M. Miller.
U.S. Appl. No. 61/510,206, filed Jul. 21, 2011, titled "Coupling Coil ac Resistance Minimization using Graphene Coatings", First Named Inventor: John M. Miller.
(Continued)

*Primary Examiner* — Rexford Barnie
*Assistant Examiner* — Thai Tran
(74) *Attorney, Agent, or Firm* — Scully, Scott, Murphy & Presser P.C.

(57) ABSTRACT

An apparatus for wirelessly charging a battery of an electric vehicle is provided with a point of load control. The apparatus includes a base unit for generating a direct current (DC) voltage. The base unit is regulated by a power level controller. One or more point of load converters can be connected to the base unit by a conductor, with each point of load converter comprising a control signal generator that transmits a signal to the power level controller. The output power level of the DC voltage provided by the base unit is controlled by power level controller such that the power level is sufficient to power all active load converters when commanded to do so by any of the active controllers, without generating excessive power that may be otherwise wasted.

21 Claims, 12 Drawing Sheets

(51) Int. Cl.
*H02J 5/00* (2006.01)
*H02J 7/02* (2006.01)

(56) References Cited

U.S. PATENT DOCUMENTS

| | | | |
|---|---|---|---|
| 8,310,202 B2 | 11/2012 | Scudiere | |
| 8,508,184 B2* | 8/2013 | Sakakibara et al. | 320/108 |
| 2005/0035748 A1* | 2/2005 | Inn | 323/285 |
| 2009/0045773 A1 | 2/2009 | Pandya et al. | |
| 2009/0121675 A1 | 5/2009 | Ho et al. | |
| 2011/0181240 A1* | 7/2011 | Baarman et al. | 320/108 |
| 2011/0254377 A1* | 10/2011 | Wildmer et al. | 307/104 |
| 2012/0039102 A1* | 2/2012 | Shinoda | 363/123 |

OTHER PUBLICATIONS

U.S. Appl. No. 61/510,210, filed Jul. 21, 2011, titled "Regulation Control and Energy Management Strategy for Wireless Power Transfer", First Named Inventor: John M. Miller.

U.S. Appl. No. 61/510,231, filed Jul. 21, 2011, titled "WPT EVSE Installation and Validation Tool", First Named Inventor: John M. Miller.

U.S. Appl. No. 61/532,763, filed Sep. 9, 2011, titled "Vehicle to Wireless Power Transfer coupling Coli Alignment Sensor", First Named Inventor: John M. Miller.

International Search Report and Written Opinion dated Apr. 11, 2013, issued in corresponding International Application No. PCT/US2013/021146.

* cited by examiner

WIRELESS POWER CHARGING USING POINT OF LOAD CONTROLLED HIGH FREQUENCY POWER CONVERTERS

CROSS-REFERENCE TO RELATED APPLICATIONS

This application claims the benefit of priority from U.S. provisional application No. 61/598,387, filed on Feb. 14, 2012, the contents of which are incorporated herein by reference.

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

FIELD OF THE INVENTION

The present invention relates to the field of wireless power transfer, and particularly to stationary and dynamic wireless power chargers for use in charging plug-in electric vehicles, and methods of operating the same.

BACKGROUND OF THE INVENTION

Plug-in Electric Vehicles (PEV) utilize a battery to store energy and power an electric motor to provide propulsion. When the battery becomes depleted, a PEV must be recharged for a period of time. Recharging may be performed by plugging the vehicle into an outlet or wirelessly with a primary and secondary coil. Wireless power transfer (WPT) charging has the benefit of being effortless and is the only option for in-motion vehicle charging. Vehicles may include commercial or personal passenger vehicles, unmanned vehicles, carts, and material moving vehicles such as fork lifts, mail delivery vehicles, etc.

FIG. 1A shows an exemplary wireless power transfer apparatus at Oak Ridge National Laboratory. FIG. 1B shows percentage WPT power as a function of percentage coil overlap between the primary coil and the secondary coil. FIG. 1C shows WPT reactive power flow as a function of coil position. At the primary pitch of 70%, the coupled power varies from 100% at complete alignment to 50% during overlap. This is for a fountain field pattern from the two primary coils. If the primary coil phase is reversed in one of the two a flat field results and the power dip goes to 0% for a long dwell of the secondary coil.

The Oak Ridge National Laboratory WPT test apparatus shown in FIG. 1A has demonstrated that this same sensitivity of throughput power, relative to position, applies to the secondary to primary coil alignment during stationary charging as well as to the in-motion case. The coupling coefficient k is strongly dependent on coil diameter and spacing. For example, a pair of 0.35 m radius coils having a separation distance z=150 mm, which is typical of passenger vehicle application, will have a coupling coefficient k=0.27. Note that a high value of k will lead to good power throughput of the WPT system.

Another aspect of the WPT efficiency challenge is coupling coil conductor type and design. In the present examples, the coils are fabricated out of Litz cable. This multi-strand configuration or Litz construction is designed to minimize the power losses exhibited in solid conductors due to skin-effect. Skin effect refers to the tendency of current flow in a conductor to be confined to a layer in the conductor close to its outer surface. At low frequencies, skin effect is negligible, and current is distributed uniformly across the conductor. However, as the frequency increases, the depth to which the flow can penetrate is reduced. Litz wires counteract this effect by increasing the amount of surface area without significantly increasing the size of the conductor.

The primary coil may have a larger gauge Litz cable with fewer turns than the secondary coil. The reason is that primary current is high due to the relatively low k values in WPT systems while the secondary coil current is lower and more turns are necessary to deliver the high voltages needed for Plug-in Electric Vehicles (PEV's). A typical PEV battery pack voltage may range from 288V to over 400V with a nominal of 325 V. For WPT secondary coils interfaced to commercially available on-board-chargers the secondary voltage will need to be in the range of 390 Vdc to 410 Vdc with good regulation.

Laboratory testing shows that the Litz cable wound coils have a significantly lower alternating current (AC) resistance than copper tube and flat copper ribbon coil designs. Winding design is 14 AWG Litz cable, 5-in hand, 7 turns, distributed coil having $R_{dc}$=18.7 mOhm. The new distributed wound coil resistance at 25 kHz is 1.8 times its direct current (DC) resistance versus the copper tubing and copper ribbon cables that exhibit 4.6 times their DC resistance at 25 kHz. Characterization results obtained for an exemplary Litz cable core are shown in Table 1 below.

TABLE 1

Inductance and Resistance of an exemplary Litz coil as a function of frequency.

| | Test frequency (kHz) | | |
|---|---|---|---|
| | 20 | 25 | 30 |
| Inductance (µH) | 35.46 | 36.1 | 36.28 |
| Resistance (mOhm) | 31.5 | 34.6 | 36.1 |

The Litz cable ac resistance follows the square root of frequency that is characteristic of the skin depth for copper. The analytical curve fit to the laboratory test data over a frequency range of 15 kHz to 30 kHz in FIG. 2 is given by equation (1), where $R_{dc}$ is the material resistance at 20° C., $a_0$ and $b_0$ are appropriate constants and $f_0$ is a selected base frequency approximately 40% of the maximum frequency range of interest.

$$R_{ac} = R_{dc}\left(1 + a_0\left(\frac{f}{f_0}\right)^{b_0}\right) \quad (1)$$

For the graph in FIG. 2, the coefficient on the frequency term, $a_0$=0.8 when $f_0$=25 kHz. When non-ferrous or ferrous metal is near Litz cable the parameter $a_0$ change is substantial leading to much higher AC resistance. This raises a concern that a cable connecting the Wireless Power Transfer Base Converter (WPTB) to a primary coil on a residential garage floor for example would have wire mesh or rebar in the concrete below, which may lead to high losses and lower performance than tolerable. This was but one motivation for the innovations provided in this disclosure.

A second motivating factor is the necessity for multiple space charging, for example the parking ramp scenario, where multiple vehicles can be charging, each at a separate power level from the others due to current state of charge, but all connected to the utility at a point of common connection.

Commercially available WPT chargers are being evaluated at various industrial sites, including by the automotive original equipment manufacturers (OEM's) and others. Some performance testing has started at Argonne National Laboratory using PEV's with a WPT. Results from the Society of Automotive Engineers (SAE) Level 2 charger (3.3 kW) show 85% efficiency from grid connection to vehicle battery. This efficiency lies in the need to drive several meters of Litz cable between the grid-tied high frequency power converter and the primary coil or pad.

Additionally, loss is incurred in the primary coil itself due to skin and proximity effects. For a single WPT charging station, such as single space residential garage, the benefits of this disclosure will mainly be in the realization of higher efficiency. However, the real benefits accrue when multiple charging spaces are demanded from a common grid-tied power stage and dc distribution to dedicated point of load HF power converters and compensating capacitors built integral to the primary coil.

The disclosed method of the present disclosure also solves the coil sequencing problem facing dynamic in-motion WPT charging. With the Point of Load (POL) concept, single or pair-wise excitation of embedded roadway coils can be energized only as the WPT equipped vehicle moves above them. The vehicle secondary coil (can also be pair of coils for better pick-up) then intercepts the energized coil(s) magnetic field producing non-contacting power transfer to the vehicle in the manner shown in FIGS. 1B and 1C. The details of both stationary and dynamic POL charging are discussed in the Detailed Description of the Invention section below.

SUMMARY OF THE INVENTION

The present disclosure provides a wireless power transfer charging system including a point of load control, and a method for operating the same. An apparatus for wirelessly charging a battery of an electric vehicle comprises a base unit for generating a direct current (DC) voltage. The base unit is regulated by a power level controller. Also, one or more point of load converters can be connected to the base unit by a conductor, with each point of load converter comprising a control signal generator that transmits a signal to the power level controller. The output power level of the DC voltage provided by the base unit is controlled by power level controller such that the power level is sufficient to power all active load converters when commanded to do so by any of the active controllers, without generating excessive power that may be otherwise wasted.

According to an aspect of the present disclosure, an apparatus for wireless power transfer is provided. The apparatus includes: an active front end unit configured to provide a unipolar output voltage; a buck-boost converter configured to receive the unipolar output voltage and to generate a DC supply voltage to at least one DC power transmission cable; an output power controller that determines a load level of electrical power to be wirelessly transmitted and controls an output power level provided by the DC supply voltage to the at least one DC power transmission cable; and at least one point-of-load converter, each including a high frequency alternating current (AC) current generation circuit that is connected to one of the at least one DC power transmission cable and is configured provide AC current through at least one power transmission circuit, wherein each of the at least one power transmission circuit includes a primary coil for wireless power transfer.

According to another aspect of the present disclosure, a method for wireless power transfer is provided. A wireless power transfer apparatus is provided, which includes an active front end unit configured to provide a unipolar output voltage; a buck-boost converter configured to receive the unipolar output voltage and to generate a DC supply voltage to at least one DC power transmission cable; and at least one point-of-load converter, each including a high frequency alternating current (AC) current generation circuit that is connected to one of the at least one DC power transmission cable and is configured provide AC current through at least one power transmission circuit. Each of the at least one power transmission circuit includes a primary coil for wireless power transfer. The method includes a step of determining a load level of electrical power to be wirelessly transmitted; and a step of controlling an output power level provided by the DC supply voltage to the at least one DC power transmission cable such that the output power level is proportional to the determined load level of electrical power to be wirelessly transmitted.

DETAILED DESCRIPTION OF THE INVENTION

As stated above, the present invention relates to stationary and dynamic wireless power chargers for use in charging plug-in electric vehicles, and methods of operating the same, which is now described in detail with accompanying figures. The drawings are not drawn to scale.

Examples of wireless power transfer devices are described in: U.S. Patent Application Publication No. 2012/0043930 A1 published on Feb. 12, 2012 and issued as U.S. Pat. No. 8,310,202 on Nov. 13, 2012, and U.S. Provisional Patent Application Ser. Nos. 61/510,231, filed Jul. 21, 2011; 61/510,210, filed Jul. 21, 2011; 61/510,206, filed Jul. 21, 2011; and 61/532,763, filed Sep. 9, 2011, each of which are incorporated herein by reference. Further, U.S. patent application Ser. No. 13/484,404 titled "REGULATION CONTROL AND ENERGY MANAGEMENT SCHEME FOR WIRELESS POWER TRANSFER" and filed on May 31, 2012 is incorporated herein by reference.

As used herein, "wireless power transfer" refers to the transmission of electrical energy from a power source to an electrical load through an inductive coupling between a primary coil and a secondary coil.

As used herein, a "grid converter" herein refers to a device that takes alternating current (AC) supply voltage having a frequency less than 1 kHz and generated alternating current (AC) supply voltage having a frequency greater than 1 kHz.

As used herein, a point-of-load converter (POLC) refers to a DC to AC converter that is configured to provide an AC current through a primary coil for wireless power transfer to a load that moves into a position in proximity to the primary coil.

As used herein, a wireless power transfer (WPT) space of a point-of-load converter refers to a spatial extent of a region within which a receiver coil can be placed to effectively perform wireless power transfer from the point-of-load converter.

According to an embodiment of the present disclosure, a single power inverter in a wireless power transfer (WPT) point of load (POL) charging system can power multiple primary coils. The WPT POL charging systems of the present disclosure can solve existing challenges facing wireless charging of multiple vehicles in a parking ramp as well as sequential energizing of roadway embedded coils for dynamic charging. The WPT POL charging systems of the present disclosure further enables in-motion charging to accommodate charging of multiple vehicles in a single lane, each having different headway and with its unique instantaneous power demand. Thus, the WPT POL charging systems of the present disclosure provide features that were not possible with previously known single WPT base units that drive multiple primary coils.

Figure 3:
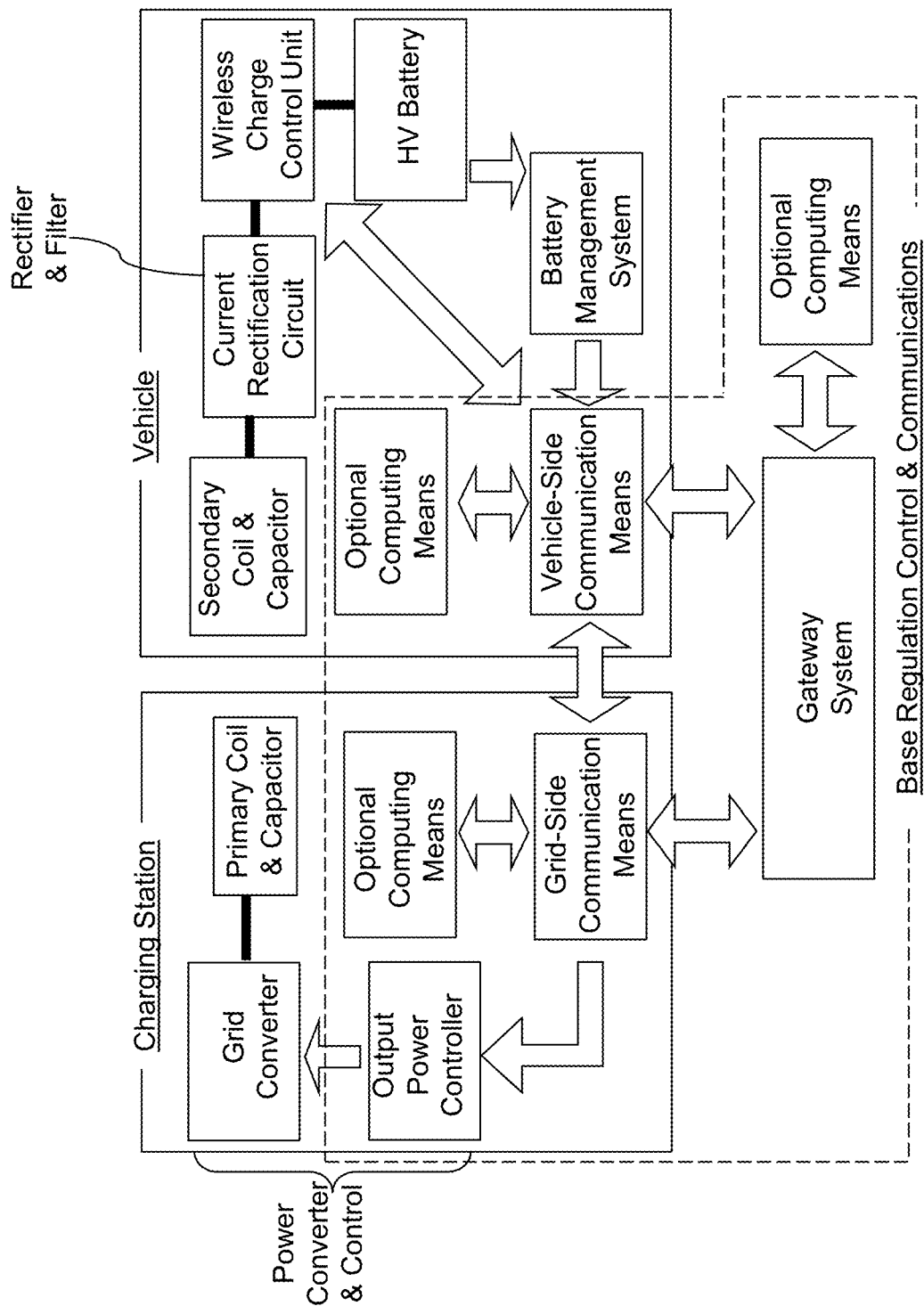
FIG. 3 is a diagram illustrating operational principles of wireless power transfer systems according to embodiments of the present disclosure.

Referring to FIG. 3, operational principles of a wireless power transfer system according to an embodiment of the present disclosure are illustrated. The illustrated WPT system includes a charging station, a vehicle, and an optional gateway system, and an optional computing means in communication with the gateway system. The charging station includes the primary circuit, which includes the grid converter and the primary coil. The vehicle includes the secondary circuit, which includes the secondary coil, the current rectification circuit, a wireless charge control unit, and a high voltage (HV) battery. The total impedance of the current rectification circuit, the wireless charge control unit, and the HV battery as seen by the combination of the secondary coil and a parallel tuning capacitor of the secondary circuit is herein referred to as the load of the secondary circuit.

The primary circuit includes a grid converter and a primary coil located in a primary pad. The secondary circuit is located in the vehicle and includes a secondary coil, a parallel tuning capacitor, a current rectification circuit connected to the secondary coil, and a battery connected to the current rectification circuit. The vehicle further includes a battery management system configured to measure at least one parameter of the battery, and a vehicle-side communication means configured to transmit information on the at least one parameter of the battery. The at least one parameter is a measure of an effective resistance of the battery as seen by the primary circuit. The charging station can further include an output voltage controller configured to control an alternating current (AC) output voltage of the grid converter based on information derived from the at least one parameter of the battery.

In one embodiment, the AC output voltage can be a quasi-square wave or a square wave, and has a duty ratio in a range from, and including, 0 to, and including, 1. The output voltage controller can be configured to control at least one of a duty cycle of the AC output voltage, a frequency of the AC output voltage, and a magnitude of the AC output voltage. Additionally or alternately, the output voltage controller can be configured to control a duty cycle of the AC output voltage, a frequency of the AC output voltage, and a magnitude of the AC output voltage.

In one embodiment, the at least one parameter of the battery measured by the battery management system can include at least one of temperature of the battery, a voltage level of the battery, and state of charge of the battery. In one embodiment, the at least one parameter of the battery measured by the battery management system can include the temperature of the battery, voltage level of the battery, and state of charge of the battery. Additionally or alternately, the at least one parameter of the battery measured by the battery management system can include the charge rate of the HV battery.

In one embodiment, the at least one parameter of the battery measured by the battery management system can include a parameter that is identical to, or is linearly proportional to, the effective resistance of the battery as seen by the primary circuit.

Optionally, a gateway system can be provided. The gateway system can be configured to receive information on the at least one parameter of the battery as transmitted by the vehicle-side communication means, and can be configured to transmit the information derived from the at least one parameter, directly or indirectly, to the output voltage controller. In one embodiment, the gateway system can employ internet.

In one embodiment, a grid-side communication means can be provided. The grid-side communication means can be configured to receive the information derived from the at least one parameter, and can be configured to relay the information derived from the at least one parameter to the output voltage controller.

In one embodiment, the information derived from the at least one parameter of the battery includes a target value for each of one or more waveform parameters of the AC output voltage of the grid converter. In one embodiment, a computation means configured to generate the one or more target values from the at least one parameter of the battery can be provided within the vehicle, within the charging station, or outside the vehicle and outside the charging station as an independent unit. The computation means is in communication with at least one of a vehicle-side communication means provided within the vehicle, a grid-side communication means provided within the charging station, or with the gateway system. The vehicle-side communication means, the grid-side communication means, the computing means, the output voltage controller for the grid converter, and the optional gateway system collectively constitute a base regulation control and communications system.

In one embodiment, the gateway system can be configured to receive information on the at least one parameter of the battery as transmitted by the vehicle-side communication means, and can be configured to transmit the one or more target values for each of one or more waveform parameters of the AC output voltage of the grid converter, directly or indirectly, to the output voltage controller. The computation means can be in communication with the gateway system.

In one embodiment, the computation means can be located within the vehicle and can be in communication with the battery management system and the vehicle-side communication means. The information on the at least one parameter of the battery as transmitted by the vehicle-side communication means can include the one or more target values for each of one or more waveform parameters of the AC output voltage of the grid converter.

In one embodiment, the computation means can be located within a facility that houses the grid converter, i.e., within the charging station. The computation means can be in communication with the vehicle-side communication means directly or indirectly, and the one or more target values for each of one or more waveform parameters of the AC output voltage of the grid converter can be provided to the grid converter.

In one embodiment, the one or more target values for each of one or more waveform parameters of the AC output voltage of the grid converter can include a target frequency for the AC output voltage. Additionally or alternatively, the one or more target values for each of one or more waveform parameters of the AC output voltage of the grid converter can include a target magnitude for the AC output voltage. Additionally or alternatively, the one or more target values for each of one or more waveform parameters of the AC output voltage of the grid converter can include a target value for a parameter that controls a magnitude of a fundamental component of the AC output voltage.

In one embodiment, the at least one parameter of the battery that the battery management system measures can include the temperature of the battery and the state of charge (SOC) of the HV battery. As used herein, the state of charge of the battery refers to the ratio of the energy stored in a battery ($Wh_x$) to the total (100% SOC) energy storage capacity of the battery ($Wh_{100}$). The computation means can be configured to determine a charge rate of the battery from the temperature of the battery and the SOC of the battery.

In one embodiment, the at least one parameter of the battery that the battery management system measures can further include a voltage level of the battery. The computation means can be configured to determine the effective resistance of the battery as seen by the primary circuit. Further, the computation means can be configured to determine an input impedance of the secondary circuit as seen by the primary circuit. In addition, the computation means can be configured to determine a frequency at which an imaginary component of input impedance of a circuit including the primary circuit and incorporating the input impedance of the secondary circuit becomes zero.

The primary pad housing the primary coil can be located in any place that a vehicle can be placed proximately to. In one embodiment, the primary coil can be located within a facility configured to park or store vehicles. In another embodiment, the primary coil can be located underneath, or over, a road configured to allow vehicles to pass through. In yet another embodiment, the primary coil can be located within a structure located on a side of a road configured to allow vehicles to pass through. In yet another embodiment, the primary coil can be located within a golf course, a cart path, or within a facility, such as a warehouse or production facility.

In a non-limiting exemplary embodiment, the output power controller and the grid-side communications means can be embodied in a grid converter V2I communications and regulation control unit. The grid converter V2I communications and regulation control unit can receive, directly or indirectly from the vehicle, dedicated short range communications (DSRC) message for charge level and frequency offset needed for energy management of the regenerative energy storage system (RESS) pack.

The base regulation control and communications function interprets the DSRC message as a command for grid converter duty ration d* and frequency offset f*. The grid converter duty ratio d* provided to the grid converter regulates WPT power level by adjusting the fundamental component, $U_1(t)$, applied to the series resonant primary of the coupling coil assembly. In this expression $T_1=1/f$, and f represents the operating frequency of WPT (when standardized: 10 kHz<f<140 kHz), and pulse time τ is given by $d*T_1/2$.

The fundamental component of a quasi-square wave voltage $U_1(t)$ can be given as Eq. (2) and can be controlled between zero and 100% duty (i.e., 0<d*<1). The limiting case of Eq. (2) where d* becomes 1 is a square wave, for which $U_1(t)$ is given by Eq. (3).

$$U_1(t) = \frac{4\tau U_d}{T_1}\left[\frac{\sin(\pi\tau/T_1)}{\pi\tau/T_1}\right]\cos(w_1 t)\bigg|_{\tau/T_1=d/2} = \frac{4U_d}{\pi}\sin(d\pi/2)\cos(w_1 t) \quad (2)$$

$$U_1(t) = \frac{4U_d}{\pi}\cos(w_1 t) \quad (3)$$

$$U_d = \frac{2\sqrt{2}}{\pi}U_{rms} \quad (4)$$

For example, a WPT base power inverter connected to a residential 240 $V_{ac}$ single phase supply will have a nominal $U_d$=216 $V_{dc}$ by application of (4). If the converter duty is 0.4, i.e., d*=0.4, then the rectified dc link voltage from Eq. (4) is converted to a high frequency WPT excitation voltage $U_1$ that is given by:

$$U_1(t)|_{d=0.4} = \frac{4\times 216}{\pi}\sin(0.4\pi/2)\cos(w_1 t); \quad (4)$$

$$Ud|_{d=0.4} \cong 162 \text{ Volts\_rms}$$

In one embodiment, signals from the battery management system (BMS) and supporting messages from the vehicle controller area network (CAN) can be routed via the vehicle regulation control and DSRC communications to the grid controller to manage RESS charging. In one embodiment, the EMS signals can include the RESS pack SOC and the temperature, which can be employed to determine the grid converter duty ratio d*. Coupling coil spacing, alignment and RESS charge rate necessitate an additional control signal for frequency offset f*.

In order to provide regulation, the WPT base unit regulation control and communications function interprets the feedback message from the vehicle being charged via Dedicated short Range Communications (DSRC) as a command for inverter duty ratio, d*, and frequency adjustment, f*. The duty command d* to the power inverter regulates WPT power level by adjusting the fundamental component, $U_1(t)$, applied to the series resonant primary of the coupling coil assembly. In this expression $T_1=1/f$, where f is the specified operating frequency of WPT (when standardized: 10 kHz<f<140 kHz) and pulse time, $\tau=d^*T_1/2$. The fundamental component of a quasi-square wave voltage $U_1(t)$ is given as Equation (2) and can be controlled between zero and 100% duty (i.e., 0<d*<1). Dc voltage control via a buck-boost converter on the grid connection provides the opportunity to effect coarse regulation of WPT power by having variable voltage, $U_d$, to the high frequency (HF) H-bridge converter.

Figure 4:
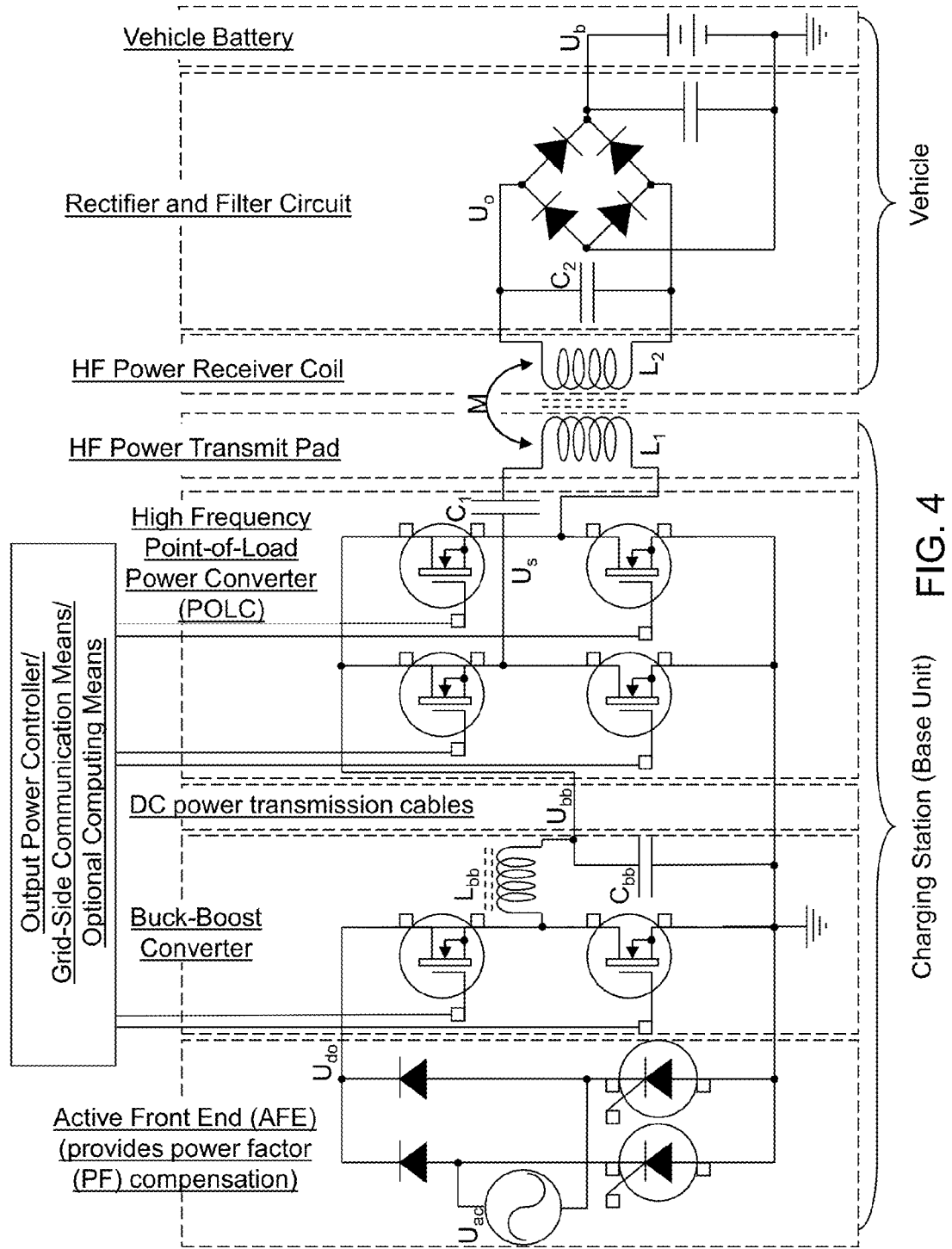
FIG. 4 is a schematic view illustrating a first exemplary wireless power transfer system including a stationary charging system and a single point of load according to an embodiment of the present disclosure.
Figure 5:
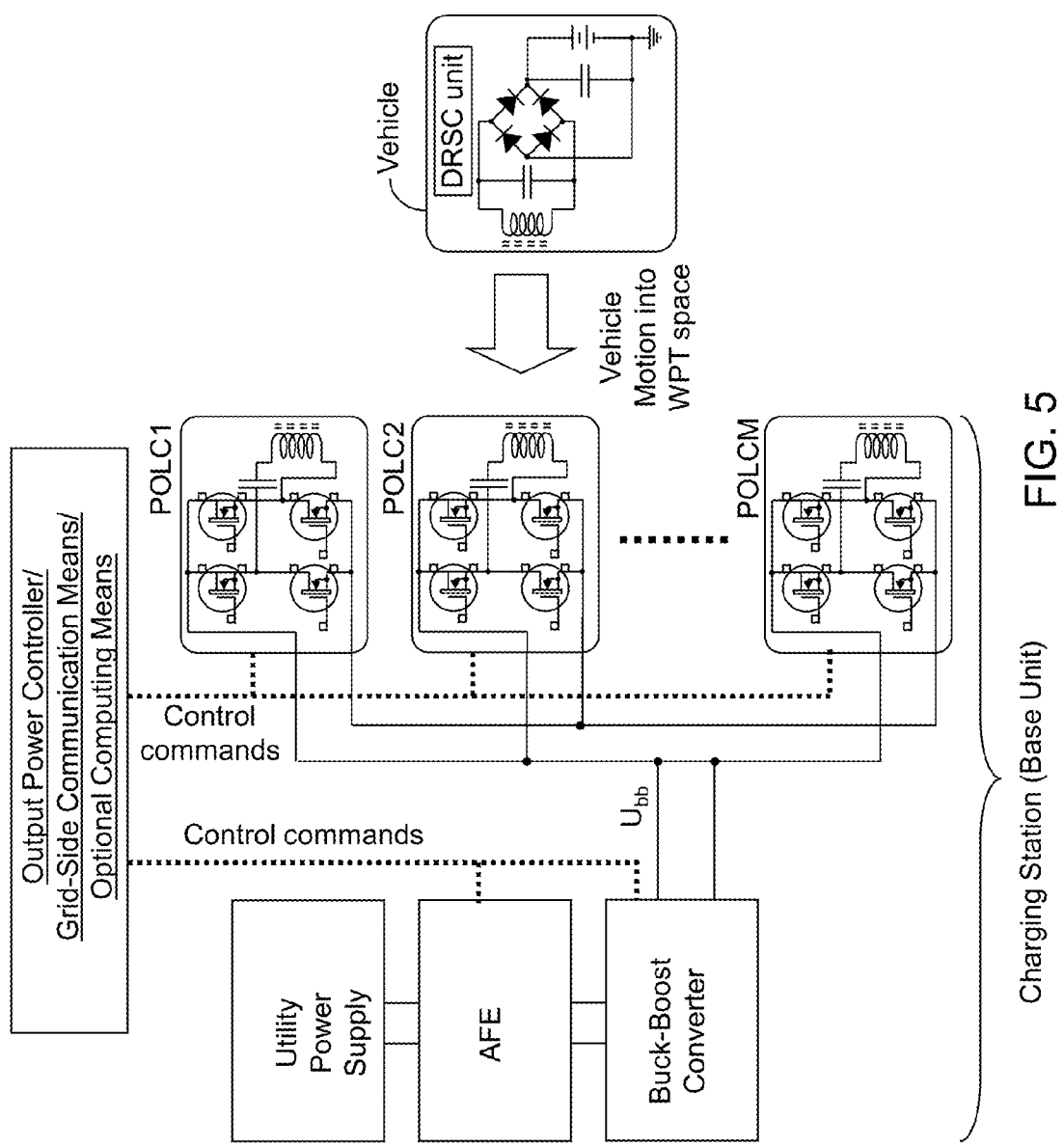
FIG. 5 is a schematic view illustrating a second exemplary wireless power transfer system including a stationary charging system and a plurality of static points of load according to an embodiment of the present disclosure.

FIG. 4 and FIG. 5 illustrate first and second exemplary wireless power transfer systems, respectively. The first exemplary wireless power transfer (WPT) system of FIG. 4 includes a stationary charging system that includes a charging station (a WPT base unit) and a single point of load (i.e., a vehicle). The second exemplary wireless power transfer (WPT) system of FIG. 5 includes a stationary charging system that includes a charging station configured to accommodate a plurality of points of load (i.e., multiple vehicles).

The charging station includes an active front end (AFE) unit, a buck-boost converter, a control module including an output power controller and optionally including grid-side communication means and optional computing means, at least one direct current (DC) power transmission cable, at least one high frequency point-of-load power converter (POLC), and at least one high frequency power transmit pad including a primary coil. Each vehicle includes a high frequency receiver coil (which is a secondary coil), a rectifier and filter circuit, and a vehicle battery.

The active front end (AFE) unit, i.e., an AFE converter, is connected to a utility power supply, and provides power factor correction. The AFE unit generates a unipolar output voltage $U_{do}$, which has the same polarity relative to electrical ground during the operation of the AFE unit. For example, the unipolar output voltage may be non-negative (positive or zero) at all times, or non-positive (negative or zero) at all times.

The AFE unit may include only passive rectification devices (such as diodes), or may include rectification devices with active electronic control. If the AFE unit includes rectification devices with active electronic control, the control signals may be provided by the output power controller. In one embodiment, the rectification devices with active electronic control may include thyristors configured to be controlled through input voltages. In one embodiment, additional electronic components such as capacitors may be provided to stabilize the unipolar output voltage $U_{do}$. Thus, the unipolar output voltage $U_{do}$ may vary with twice the frequency of the grid power supply voltage $U_{ac}$ (i.e., at 120 Hz), or may be substantially constant through voltage stabilizing electronic components (such as capacitors—not shown), or may have a substantially constant direct current (DC) component and a superposed ripple having twice the frequency of the grid power supply voltage $U_{ac}$.

The first exemplary WPT system further includes a buck-boost converter, i.e., a buck-boost voltage regulator stage, that is connected to the AFE unit. The buck-boost converter is configured to receive the unipolar output voltage $U_{do}$ and to generate a DC supply voltage $V_{bb}$ to at least one DC power transmission cable.

In one embodiment, the buck-boost converter can include a set of current switching devices, and the output power controller changes a duty cycle of the set of current switching devices in linear proportion to the determined load level of electrical power to be wirelessly transmitted. In an illustrative example, the set of current switching devices can include a pair of field effect transistors connected in a series connection across the output node for the unipolar output voltage $U_{do}$ and electrical ground.

In one embodiment, the buck-boost converter contains an output stage that includes a series connection of an inductor $L_{bb}$ and a capacitor $C_{bb}$. The DC supply voltage $V_{bb}$ can be provided at a node between the inductor $L_{bb}$ and the capacitor $C_{bb}$, and across the capacitor $C_{bb}$.

Each high frequency point-of-load power converter, or a point-of-load converter (POLC), is a DC to AC converter that generates a high frequency alternating current (AC) output. As used herein, a "high frequency" refers to any frequency in a range from 1 kHz to 1 MHz. In one embodiment, the output frequency of the POLC can be selected in a range from 10 kHz to 50 kHz, or any frequency adopted as a standard frequency for wireless power transfer. The POLC includes a high frequency alternating current (AC) current generation circuit, i.e., a DC to AC converter.

In one embodiment, the high frequency alternating current (AC) current generation circuit can include an H-bridge that is configured to operate at the frequency of the wireless power transmission. In one embodiment, the high frequency alternating current (AC) current generation circuit can include a set of 4 metal-oxide-semiconductor field effect transistors (MOSFET's) with push-push connections to a primary coil. In one embodiment, the primary coil may be "tuned," or compensated, at a resonance frequency selected from a range from about 22 kHz and to about 24 kHz using a distributed wound coil.

Each high frequency alternating current (AC) current generation circuit is connected to the DC power transmission cable and is configured to provide AC current through at least one power transmission circuit. Each of the at least one power transmission circuit can include a primary coil for wireless power transfer. In one embodiment each of the power transmission circuits can include a series connection of a primary capacitor $C_1$ and a primary coil (inductor) $L_1$.

The target gap between a primary coil and a secondary (receiver) coil is adjustable. The target gap can be optimized to provide efficiency and reproducibility of the wireless power transfer. In one embodiment, the target gap can be designed while accounting for insertion loss due to up to 100 mm thick concrete and bitumen (asphalt) that is encountered in roadside installation of the primary coils. Further, the target gap can be optimized to account for presence of other roadway surfacing materials or other materials commonly used in parking garages and production facilities.

The secondary coil in a vehicle may have a unitary coil turn ratio relative to the primary coil, or may have a coil turn ratio greater than 1.0. Coupling coil compensation schemes may be series-parallel (S-P) (i.e., a series connection for the primary coil and the primary capacitor and a parallel connection for the secondary coil and the secondary capacitor), but an L-C-L configuration may be employed in which an isolation transformer is used. In the L-C-L configuration, the isolation transformer can be designed to have relatively high leakage, which is compensated with a series capacitor. The final L can be the inductance of the WPT primary coil. In this case, high frequency distribution from a grid-tied power converter to an on-floor or embedded primary coil can be avoided. Provisions can be made to isolate the grid-tied electronics from the POLC. Either half wave or full wave rectification may be used in the rectifier and filter circuit of a vehicle. Secondary side regulation electronics may also be used.

Once a vehicle moves into a wireless power transfer (WPT) space, information on the vehicle can be transmitted to the control module including the output power controller. The information on the vehicle can include the type of battery on the vehicle, the charging state of the battery of the vehicle, and any other optional parameters that the operator of the vehicle may select such as desired rate of charging. Transmission of the information from the vehicle to the control module can be effected by wireless communication, which can employ dedicated short range communication (DSRC) or controller area network (CAN) communication.

Based on the information transmitted to the control module, the output power controller determines a load level of electrical power to be wirelessly transmitted through the at least one primary coil connected to the at least one POLC. The output power controller controls an output power level provided by the DC supply voltage to the at least one DC power transmission cable. In one embodiment, the output power controller can maintain the DC supply voltage $V_{bb}$ substantially constant irrespective of variations in the output power level. In one embodiment, the buck-boost converter can include a series of field effect transistors that turn on and turn off to maintain the DC supply voltage $V_{bb}$, and the gate dwell time of the field effect transistors (i.e., the time during which the field effect transistors are turned on) can be controlled in proportion to the total load level as determined by the control module based on the DSRC or CAN communications, i.e., the arithmetic sum of all load levels that the at least one vehicle located within WPT spaces transmit to the control module.

In the first and second exemplary WPT systems, the utility connection supplies electrical power to the AFE unit, which can provide power factor correction and an output voltage control for the unipolar output voltage $U_{do}$. The AFE and buck-boost converters can be controlled by the control module, which can include the vehicle to infrastructure communications link from the vehicle via dedicated short range communications (DSRC) or the CAN communication. The WPT base unit generates regulated DC supply voltage $V_{bb}$ at a power level sufficient to power all of the POL converters and their primary coils as needed at any point in time.

The grid-tied converter includes the AFE and the buck-boost converter, and is a portion of a charging station (base unit). The at least one DC cable transfers the power from the buck-boost converter to the at least one POLC, which can be a single POLC as in FIG. 4 or a plurality of POLC's as in FIG. 5. Here, the output power controller also delivers control command signals (e.g., high speed gate control signals) to the at least one POLC. The command link for providing the control command signals can be implemented via high frequency twisted pairs of cables, via fiber optic cables, or via wireless communication. If an integer M (M>1) of POLC's are present within the charging station, the control command signals can be addressed to each of the M POLC's to individually (1 to M units) control each POLC.

If each of the M POLC's is configured to provide wireless power transfer at a rated power of $P_r$, the maximum power that the charging station can supply is $M \times P_r$. The rating of the AFE unit and the buck-booster converter is at least equal to $M \times P_r$, i.e., $P_{grid} \geq M \times P_r$, where $P_{grid}$ is the rating of the AFE unit and buck-booster converter. The power level supplied by the AFE unit and buck-booster converter at any time can be integer multiples of the rated power of $P_r$, i.e., $k \times P_r$ in which k is an integer from 0 to M. Alternately, if the any POLC is configured to transmit WPT power at less than the rated power $P_r$ upon identification of a vehicle within its WPT space as a vehicle requiring less power transmission than the rated power $P_r$ or upon express request from a vehicle to transmit less than the rated power $P_r$, the power level supplied by the AFE unit and buck-booster converter at any time can be the arithmetic sum of all power levels actually transmitted from the primary coils.

If the M POLC's have different rated power, the rating of the AFE unit and the buck-booster converter is at least equal to the arithmetic sum of all the ratings of the M POLC's. The power level supplied by the AFE unit and buck-booster converter can be an arithmetic sum of all ratings of the POLC's having a vehicle within a WPT space thereof. Alternately, if the any POLC is configured to transmit WPT power at less than the rated power $P_r$ upon identification of a vehicle within its WPT space as a vehicle requiring less power transmission than the rated power $P_r$ or upon express request from a vehicle to transmit less than the rated power $P_r$, the power level supplied by the AFE unit and buck-booster converter at any time can be the arithmetic sum of all power levels actually transmitted from the primary coils.

Depending on primary coil manufacturing tolerance and material characteristics, each primary coil can be compensated by a primary capacitor $C_1$, which is a tuning capacitor, individually at each coil. Distributed compensation eliminates, or at least minimizes, the mismatched tuning that would happen if two or more coils were tuned by a single series capacitor.

In one embodiment, the output power controller can be configured to switch on only a subset of the plurality of point-of-load converters having a vehicle within a wireless power transfer (WPT) field thereof. In another embodiment, the output power controller can be configured to identify an incremental load level of electrical power to be wirelessly transmitted through a wireless communication signal transmitted by a vehicle within a WPT space of any one of the plurality of point-of-load converters.

The WPT system of the present disclosure can minimize wasted power and enhance the overall efficiency of WPT by dynamically adjusting the power level supplied through the AFE unit and buck-booster converter. For example, suppose there are five spaces in a parking ramp equipped with a primary coil, i.e., M=5, and three spaces are already in use charging vehicles. This means that the AFE unit and the voltage regulator stage at the grid connection need to supply enough power adequate for the power level of the 3 POLC's. Each of the three vehicles may be, for example, SAE level 2, 6.6 kW equipped vehicles. As a fourth vehicle approaches a vacant space, and comes within a WPT space of another POLC, the fourth vehicle can be under vehicle to infrastructure (V2I) communications and navigation aide so that, when the fourth vehicle is sufficiently close to the open space and the secondary coil of the fourth vehicle comes within the WPT spacer of the POLC, the command module of the charging station sends a command to the AFE unit and the buck-booster converter to increase the power level provided at the DC supply voltage $V_{bb}$. The DC supply voltage $V_{bb}$ does not increase, but the current provided through the inductor $L_{bb}$ within the buck-booster converter increases in proportion to the increase in the total load so that the DC supply voltage $V_{bb}$ may remain substantially constant (e.g., less than 2% transient variation). Further, the command module sends an additional control command to the corresponding POLC so that the POLC turns on and provides a high frequency AC current to the primary coil of the POLC. When the fourth vehicle is parked and aligned to the primary coil, the WPT base unit sends command signals to that POLC, and simultaneously controls the power level at the node of the DC supply voltage $V_{bb}$ to be sufficient to power all four POLC's with vehicles in their WPT spaces.

Figure 6:
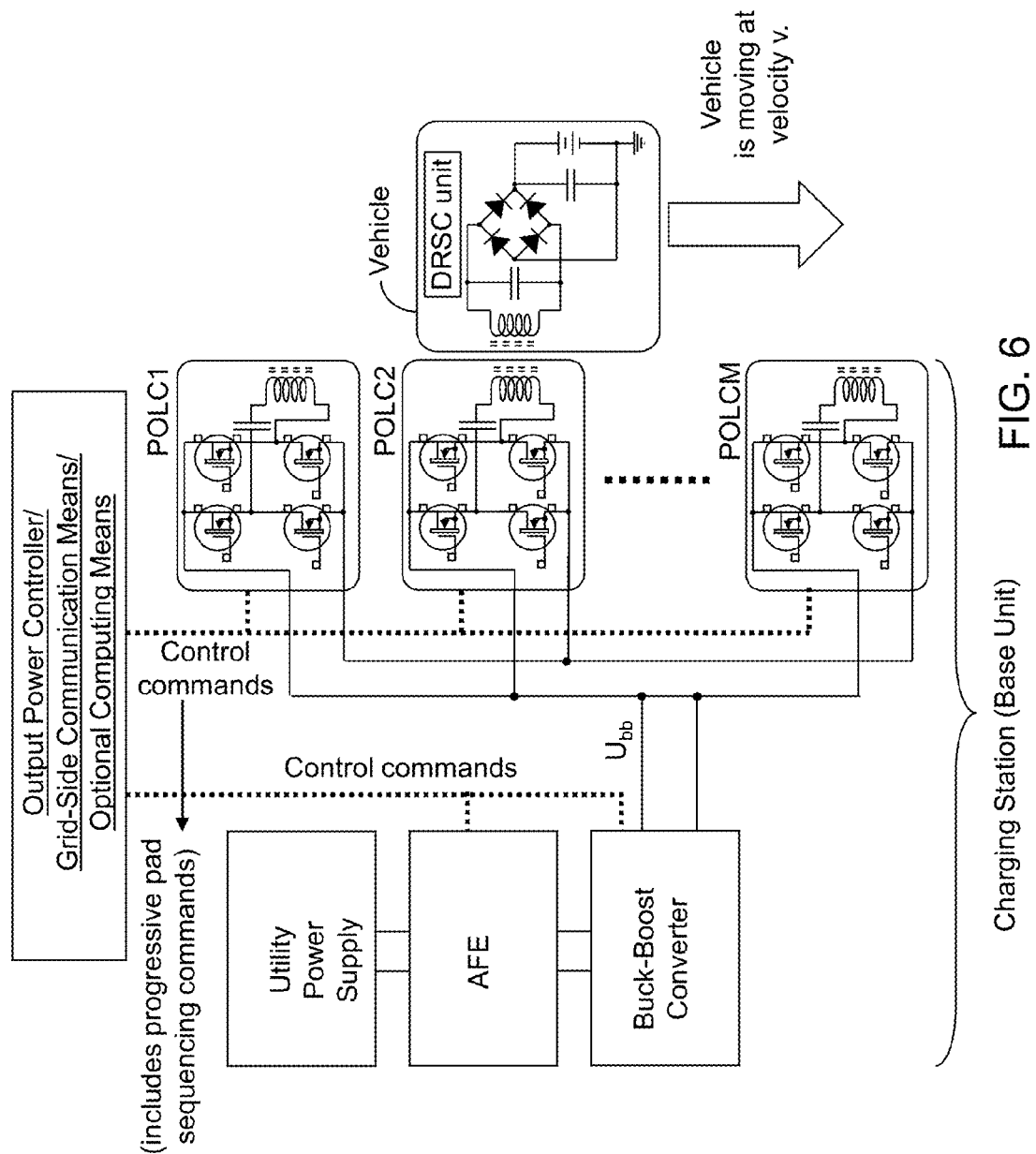
FIG. 6 is a schematic view illustrating a third exemplary wireless power transfer system including an in-motion charging system configured for a plurality of dynamic points of load according to an embodiment of the present disclosure.

The charging station can be a stationary base unit that can be employed for charging vehicles in a stationary state as illustrated in FIGS. 4 and 5, or can be a roadside or facility base unit that can be employed for in-motion charging as illustrated in FIG. 6. FIG. 6 is a schematic view illustrating a third exemplary wireless power transfer system including an in-motion charging system configured for a plurality of dynamic points of load. The in-motion (dynamic) charging can be performed in a manner similar to the stationary charging provided that a same vehicle sequentially comes within, and moved out of, a WPT space of different POLC's. Accordingly, the in-motion charging can be viewed as a limiting case of the stationary charging in which the turn-over rate of active POLC increases.

The power level supplied by the AFE unit and buck-booster converter can be an arithmetic sum of all power ratings vehicles within the WPT spaces of the charging station. Alternately, if the any POLC is configured to transmit WPT power at less than the rated power $P_r$ upon identification of any vehicle within its WPT space as a vehicle requiring less power transmission than the rated power $P_r$ or upon express request from a vehicle to transmit less than the rated power $P_r$, the power level supplied by the AFE unit and buck-booster converter at any time can be the arithmetic sum of all power levels transmitted from the primary coils. The M POLC's in FIG. 6 can be sequentially enabled and inhibited (disabled) as the vehicle moves on a strip of road or pathway (which can be a special purpose lane or a guideway), in which the primary coils of the M POLC's are installed.

The M primary coils can be configured as a linear array installed on a roadside or pathway, and the output power controller can control switching on and off of AC current through the M primary coils. Specifically, the output power controller can cause a position of a turned-on primary coil to move at a substantially same velocity as a velocity of a vehicle that moves along the linear array, and turns off electrical current through primary coils that do not magnetically couple with a receiver coil of the vehicle. The control commands from the output power controller can include a 'progressive pad sequencing command' that indicates the speed of the approaching vehicle so the base unit can provide power sequentially to a series of POLC's in the path of the vehicle in synchronization with the movement of the vehicle.

Figure 7:
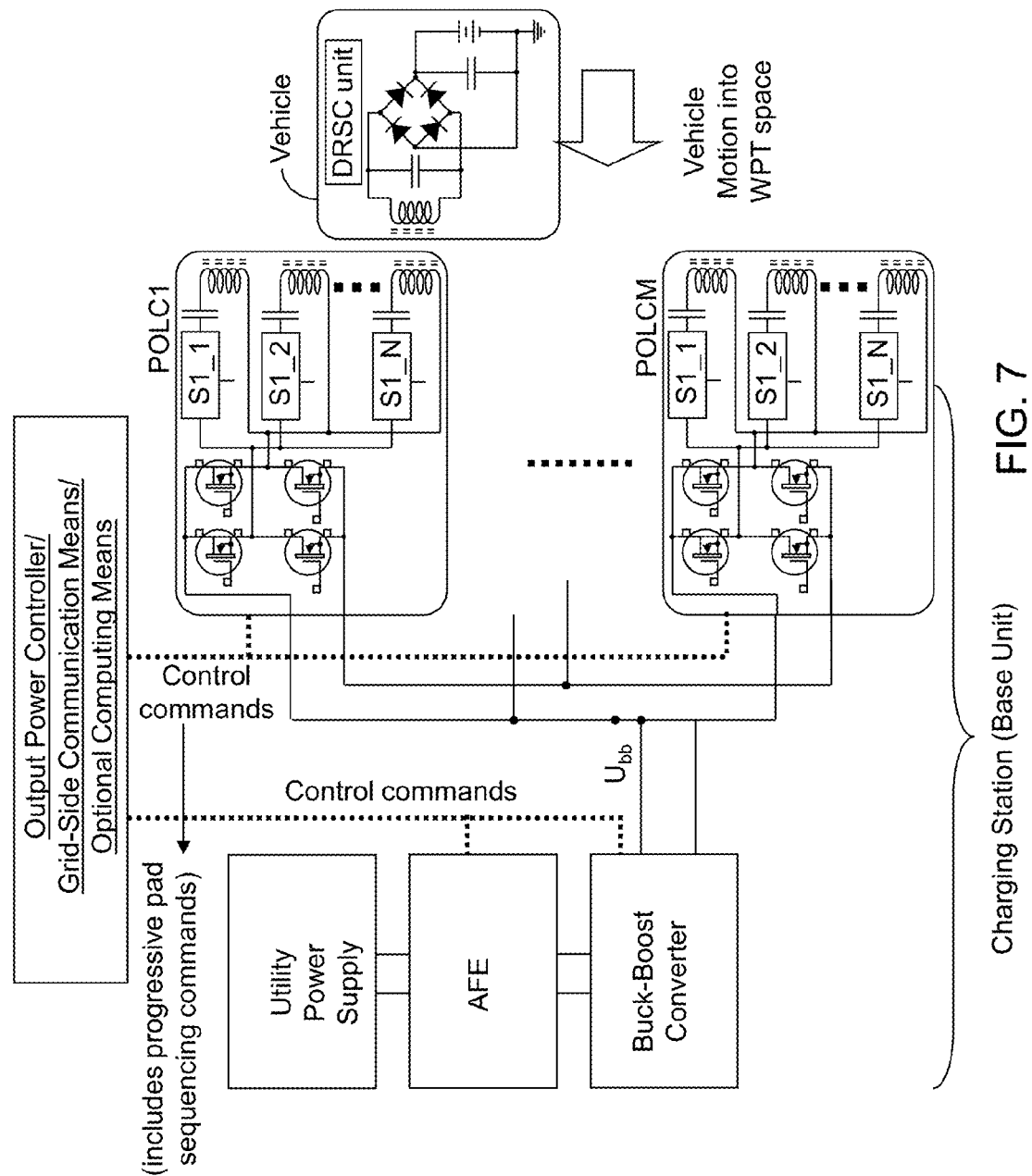
FIG. 7 is a schematic view illustrating a fourth exemplary wireless power transfer system including a stationary charging system provided with multiple primary coils per point-of-load converter and configured for a plurality of dynamic points of load according to an embodiment of the present disclosure.
Figure 8:
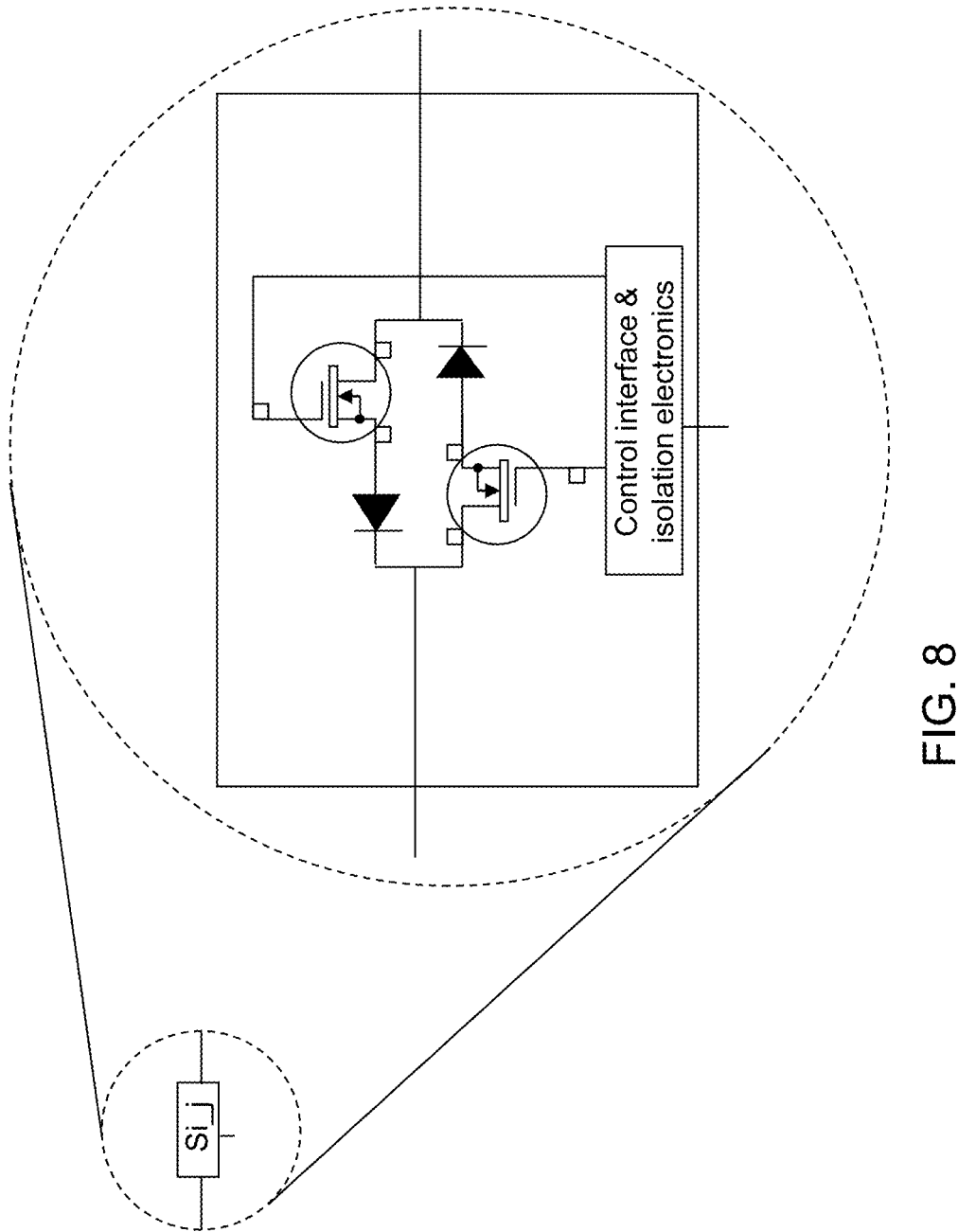
FIG. 8 is a circuit schematic of a switch that can be employed for each primary coil circuit.

Referring to FIGS. 7 and 8, a fourth exemplary wireless power transfer system and a switch therein are shown, respectively. The fourth exemplary WPT system includes a stationary charging system, and can be derived from the second exemplary WPT system by substituting a POLC including a plurality power transmission circuits for each POLC of the second exemplary WPT system.

The stationary charging system of FIG. 7 is provided with a plurality of power transmission circuits per point-of-load converter and configured for a plurality of dynamic points of load. Specifically, each POLC within the fourth exemplary WPT system includes N power transmission circuits. Each of the plurality of power transmission circuit includes a series connection of an electronically controlled switch, a primary capacitor, and a primary coil. The output power controller controls switching on and off of the electronically controlled switches.

An electronically controlled switch located within an i-th POLC and in the j-th power transmission circuit therein is labeled as "Si_j." Each electronically controlled switch can employ any set of electronic components provided that the electronically controlled switch can connect or disconnect two nodes of the electronically controlled switch based on the control commands supplied to the electronically controlled switch. The control commands can be supplied to control interface and isolation electronics within the electronically controlled switch.

The fourth exemplary WPT system includes M×N primary coils, which can be employed to accommodate M×N vehicles. By reducing the number of POLC relative to the number of primary coils by a factor of N, a large number (M×N) of transmit pads can be constructed economically.

Figure 9:
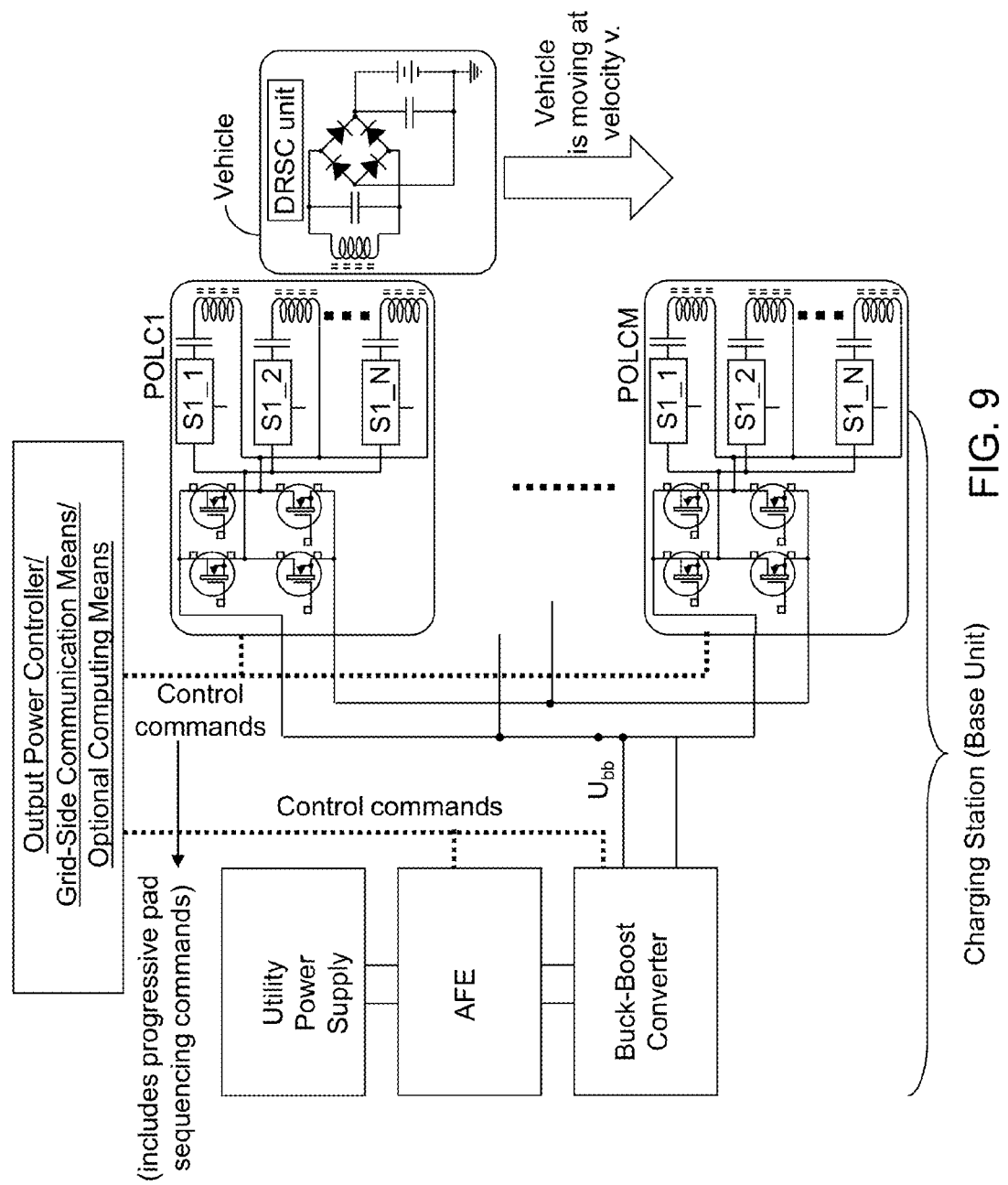
FIG. 9 is a schematic view illustrating a fifth exemplary wireless power transfer system including an in-motion charging system provided with multiple primary coils per point-of-load converter and configured for a plurality of dynamic points of load according to an embodiment of the present disclosure.

Referring to FIG. 9, a fifth exemplary wireless power transfer system is an in-motion (dynamic) charging system, and can be derived from the third exemplary WPT system by substituting a POLC including a plurality power transmission circuits for each POLC of the second exemplary WPT system, or from the fourth exemplary WPT system by making adaptations suitable for high speed sequential switching of the M×N primary coils.

The M×N primary coils can be configured as a linear array installed on a roadside, and the output power controller can control switching on and off of AC current through the M×N primary coils. Specifically, the output power controller can cause a position of a turned-on primary coil to move at a substantially same velocity as a velocity of a vehicle that moves along the linear array, and turns off electrical current through primary coils that do not magnetically couple with a receiver coil of the vehicle. The control commands from the output power controller can include a 'progressive pad sequencing command' that indicates the speed of the approaching vehicle so the base unit can provide power sequentially to a series of POLC's in the path of the vehicle in synchronization with the movement of the vehicle.

Figure 10:
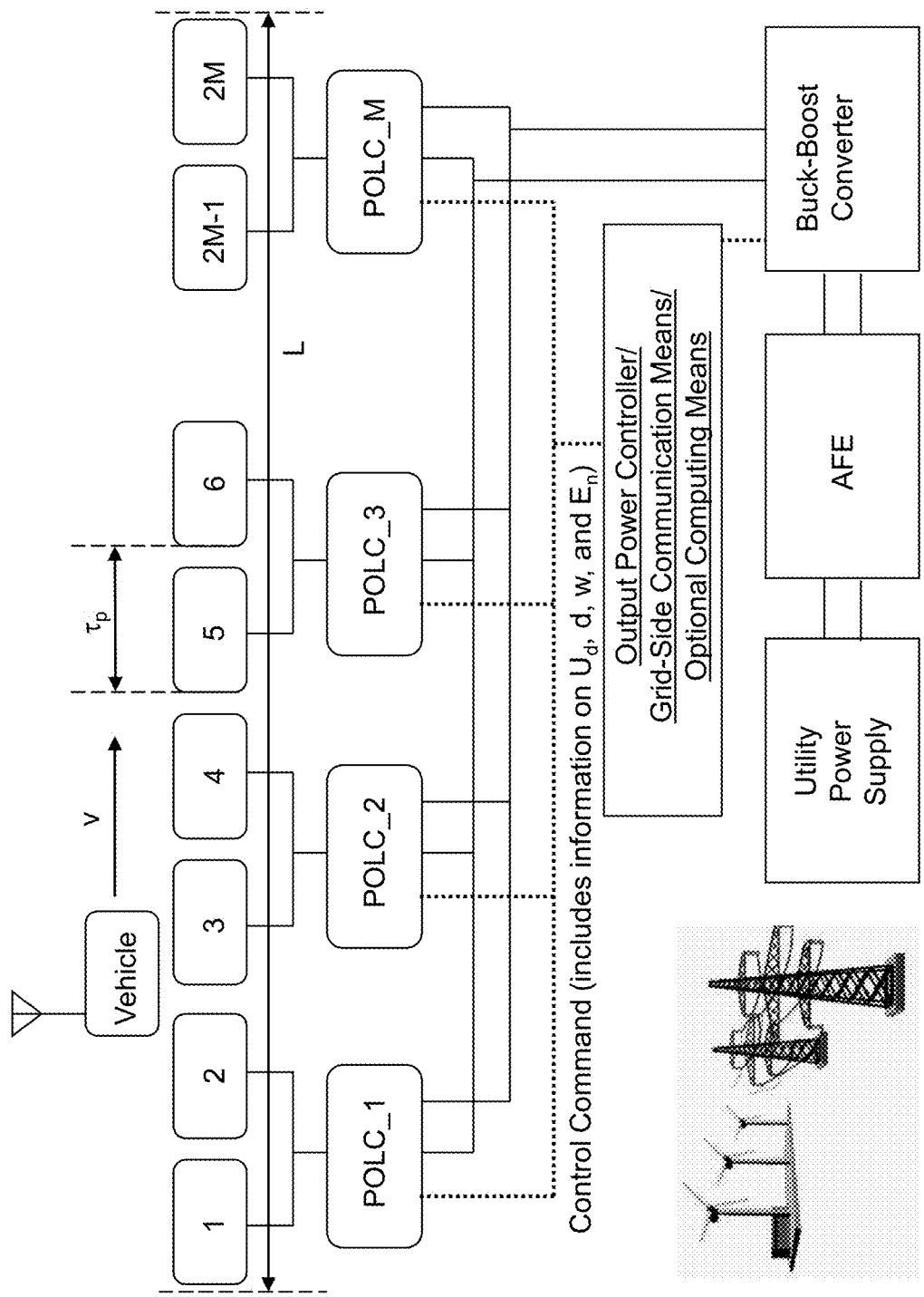
FIG. 10 is a schematic view illustrating a sixth wireless power transfer system including an in-motion charging system and a plurality of dynamic points of load according to an example of the present disclosure.

Referring to FIG. 10, a sixth wireless power transfer system including an in-motion charging system and a plurality of dynamic points of load is shown. The sixth WPT system can be derived from the fifth WPT system, for example, by setting N=2.

Figure 1A:
FIG. 1A shows an exemplary wireless power transfer apparatus at Oak Ridge National Laboratory.
Figure 1B:
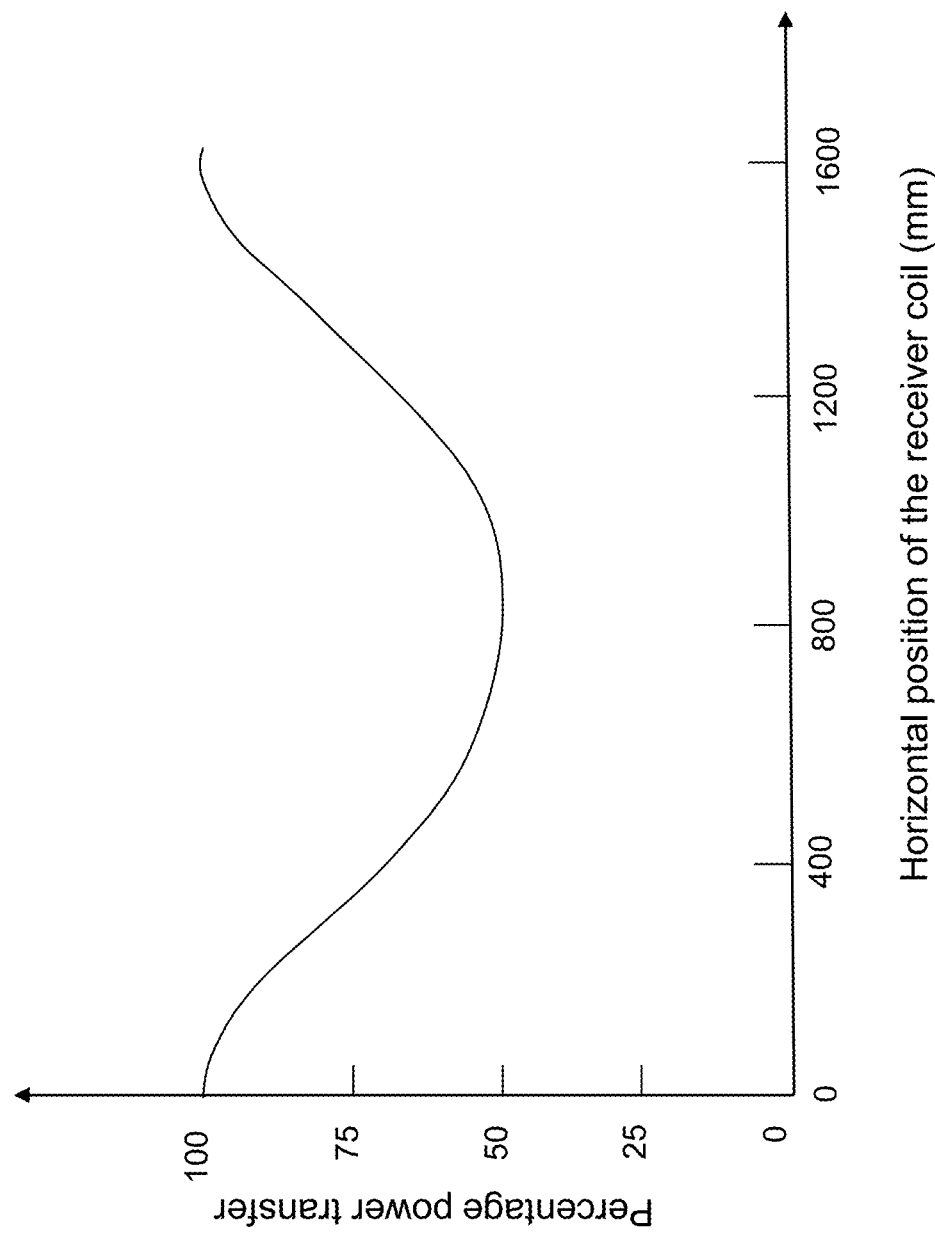
FIG. 1B shows percentage WPT power as a function of percentage coil overlap between the primary coil and the secondary coil.
Figure 1C:
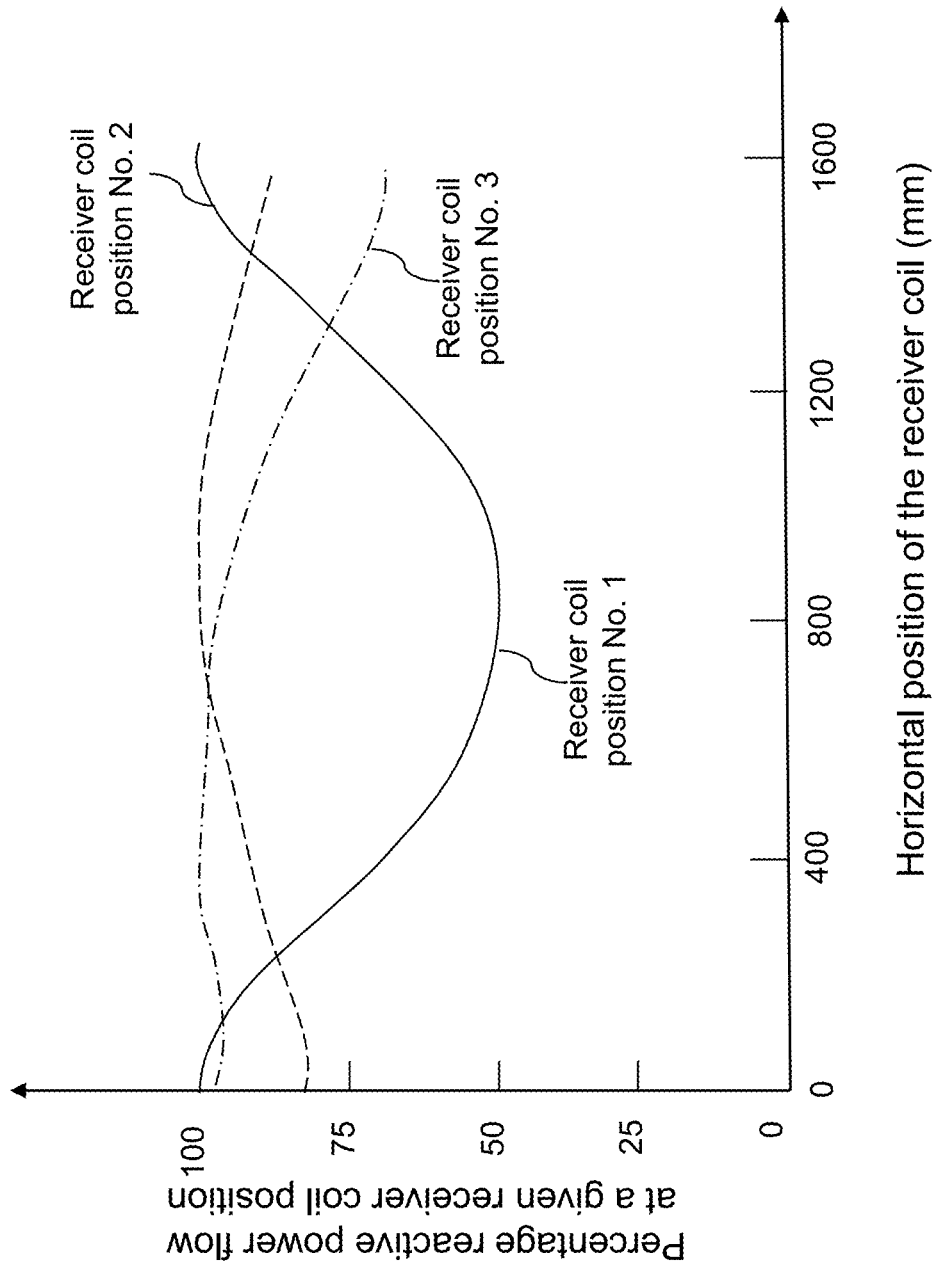
FIG. 1C shows WPT reactive power flow as a function of coil position.
Figure 2:
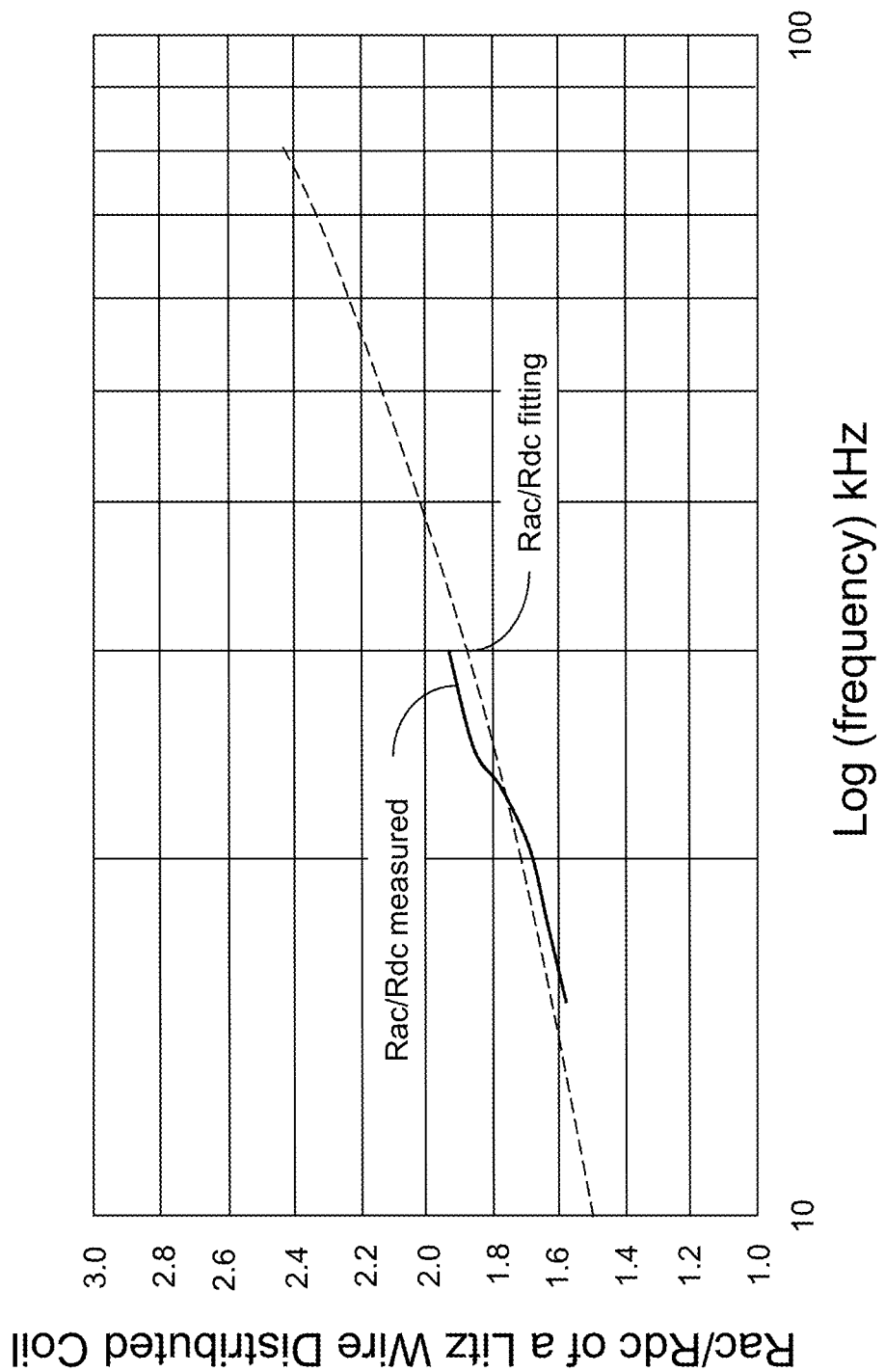
FIG. 2 is a graph illustrating a Litz cable AC resistance relative to DC resistance ratio over the frequency range from 15 kHz to 30 kHz.

In an illustrative example, suppose that M=672 (i.e., 672 pads), and buried primary coils have a pitch, $\tau_p$=0.7 meter each. The M×N primary coils form an energized track section having a length L of M×$\tau_p$=470.6 meters. Suppose further that each primary coil and each POLC are rated $P_r$=100 kW. Each POLC includes two primary coils. Then, a vehicle having a single secondary coil of the same pitch and traveling at the speed v of 55 mph (24.58 m/s) passes over a roadway coil with a crossing time, $\tau_r=\tau_p/v$=19.1 seconds. At this coil pitch, the captured power fluctuates by about 75% (See FIG. 1B) so the average charging power over the entire track PWPT is 0.75×$P_r$=75 kW. At this vehicle speed and track length the charge energy, $W_{batt}$, supplied to the vehicle battery pack, assuming 5% loss in vehicle components ($\eta$=95%) amounts to $W_{batt}=\eta \times t_c \times$PWPT=378 Wh. In general, the pads are primary coils that can be circular, square or rectangular (or any geometry) of reasonable diameter (or span along highway). In the example, use of rather small coils like as in laboratory is assumed. However, the present disclosure is not limited to such small coils (e.g., having a pitch of about 0.7 m). In general, a pitch in the range of about 70% of a diameter D (or an equivalent lateral dimension along the direction of the track) may be used. In one embodiment, the diameter D or an equivalent lateral dimension may be in a range from 0.5 m to 5 m, although lesser and greater dimensions may also be employed. For example, tracks for passenger cars may employ a diameter D or an equivalent lateral dimension in a range from 0.5 m to 1.0 m, and buses and trucks may employ a diameter D or an equivalent lateral dimension in a range from 1.0 m to 5.0 m.

For example, a battery electric vehicle at this speed requires approximately $\gamma_{veh}$=360 Wh/mile. Energizing the ~470 meter of highway with 100 kW coils and taking into account the coil pitch effect means a single 100 kW peak rated grid converter will suffice for one vehicle for one mile, including the energized section. For a single lane of traffic moving at 55 mph and applying the safe following distance, 2-second rule, results in a vehicle headway h of 2×v=51.7 m. Neglecting vehicle length means that the number of vehicles on the track N can be given by L/h=470.6 m/51.7 m≈9 vehicles. Thus, about 9 vehicles can move continuously over the energized track section. The grid tied power is therefore rated at least N×PWPT=675 kW. In utility terms this is a low level of power. It may be more realistic to assume a headway of ⅓ this value so N≈27 vehicles/track continuously. However, when long sections of highway are energized along a utility distribution line it amounts to substantial power levels during peak drive times. Of course in this scenario the vehicle battery is fully in charge sustaining mode and essentially not being used over its rated δSOC window. It can therefore be downsized to meet some targeted all electric range (AER) of say 10 miles instead of 40 miles or 100 miles. Unlimited range with in-motion WPT is therefore possible with a PEV.

While the invention has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Other suitable modifications and adaptations of a variety of conditions and parameters normally encountered in image processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims. The invention may be available for license by the assignee of record.

What is claimed is:

1. An apparatus for wireless power transfer, said apparatus comprising:
   an active front end unit configured to provide a unipolar output voltage;
   a buck-boost converter configured to receive said unipolar output voltage and to generate a DC supply voltage to a plurality of DC power transmission cables;
   an output power controller configured to control an output power level provided by said DC supply voltage to said plurality of DC power transmission cables; and
   a plurality of point-of-load converters, each of the plurality of point-of-load converters comprises a high frequency alternating current (AC) current generation circuit that is respectively connected to one of said plurality of DC power transmission cable and is configured to provide AC current through at least one power transmission circuit, wherein each of said at least one power transmission circuit comprises a primary coil for wireless power transfer, the output power controller being further configured to control the AC current provided by each of the plurality of point-of-load converters based on a determined load level of electrical power to be wirelessly transmitted from the at least one power transmission circuit in each of the respective point-of-load converters, wherein the output power level provided by said DC supply voltage is determined based on an expected power demand of all of the plurality of point-of-load converters.

2. The apparatus of claim 1, wherein said output power controller maintains said DC supply voltage substantially constant irrespective of variations in said output power level.

3. The apparatus of claim 2, wherein said buck-boost converter comprises a set of current switching devices, and said output power controller changes a duty cycle of said set of current switching devices in direct proportion to said expected power demand of all of the plurality of point-of-load converters.

4. The apparatus of claim 3, wherein said set of current switching devices comprises a pair of field effect transistors connected in a series connection across an output node for said unipolar output voltage and electrical ground.

5. The apparatus of claim 1, wherein said buck-boost converter comprises an output stage that includes a series connection of an inductor and a capacitor, and said DC supply voltage is provided at a node between said inductor and said capacitor.

6. The apparatus of claim 1, wherein said output power controller is configured to switch on only a subset of said plurality of point-of-load converters having a vehicle within a wireless power transfer (WPT) field thereof.

7. The apparatus of claim 1, wherein each of said at least one power transmission circuit comprises a series connection of an electronically controlled switch, a primary capacitor, and a primary coil, wherein said output power controller controls switching on and off of said electronically controlled switch.

8. The apparatus of claim 1, wherein said primary coil in each of the plurality of point-of-load converters are configured as a linear array installed on a roadway, a pathway, or in a facility, and said output power controller controls switching on and off of AC current through said primary coil in each of the plurality of point-of-load converters.

9. The apparatus of claim 8, wherein said output power controller causes a position of a turned-on primary coil to move at a substantially same velocity as a velocity that moves along said linear array, and turns off electrical current through primary coils that do not magnetically couple with a receiver coil of said vehicle.

10. The apparatus of claim 7, wherein said at least one power transmission circuit is a plurality of power transmission circuits and wherein said output power controller causes a position of a turned-on primary coil of the plurality of coils in each of the point-of-load converters to move at a substantially same velocity as a velocity that moves along said linear array, and turns off electrical current through primary coils of the plurality of coils in each of the point-of-load converters that do not magnetically couple with a receiver coil of said vehicle.

11. The apparatus of claim 1, further comprising a communication device configured to receive information regarding a battery in a vehicle to be charged.

12. The apparatus of claim 11, wherein the output power controller determines the load level of electrical power to be wirelessly transmitted for each of the plurality of point-of-load converters is based on the received information.

13. The apparatus of claim 12, wherein the output power controller controls a duty cycle of the high frequency alternating current (AC) current generation circuit for each of the plurality of point-of-load converters or a frequency offset for the AC current generated by the high frequency alternating current (AC) current generation circuit for each of the plurality of point-of-load converters based on the determined load level.

14. A method for wireless power transfer comprising:
providing a wireless power transfer apparatus comprising an active front end unit configured to provide a unipolar output voltage; a buck-boost converter configured to receive said unipolar output voltage and to generate a DC supply voltage to a plurality of DC power transmission cables; and a plurality of point-of-load converter, of the plurality of point-of-load converters comprises a high frequency alternating current (AC) current generation circuit that is connected to a respective one of said plurality of DC power transmission cables and is configured to provide AC current through at least one power transmission circuit, wherein each of said at least one power transmission circuit comprises a primary coil for wireless power transfer;
determining an expected power demand of all of said plurality of point-of-load converters;
determining a load level of electrical power to be wirelessly transmitted from the at least one power transmission circuit in each of the respective point-of load converters; and
controlling an output power level provided by said DC supply voltage to said plurality of DC power transmission cables such that said output power level is proportional to said determined expected power demand of all of the plurality of point-of-load converters; and
controlling the AC current provided by each of the plurality of point-of-load converters based on the determined load level of electrical power to be wirelessly transmitted from the at least one power transmission circuit in each of the respective point-of-load converters.

15. The method of claim 14, further comprising maintaining said DC supply voltage substantially constant irrespective of variations in said output power level.

16. The method of claim 14, further comprising:
detecting presence or absence of a vehicle within a wireless power transfer (WPT) field of each of said plurality of point-of-load converters; and
switching on only a subset of said plurality of point-of-load converters having a vehicle within a wireless power transfer (WPT) field thereof, while switching off a complementary set of said subset.

17. The method of claim 14, wherein each of said at least one power transmission circuit comprises a series connection of an electronically controlled switch, a primary capacitor, and a primary coil, and said method further comprises controlling switching on and off of said electronically controlled switch.

18. The method of claim 14, further comprising:
providing said primary coil in each of the plurality of point-of-load converters as a linear array installed on a roadway, a pathway, or in a facility; and
controlling switching on and off of AC current through said primary coil in each of the plurality of point-of-load converters.

19. The method of claim 18, further comprising:
moving a position of a turned-on primary coil at a substantially same velocity as a velocity that moves along said linear array; and
turning off electrical current through primary coils that do not magnetically couple with a receiver coil of said vehicle.

20. The method of claim 14, further comprising: receiving information regarding a battery in a vehicle to be charged.

21. The method of claim 20, wherein the load level of electrical power to be wirelessly transmitted for each of the plurality of point-of-load converters is determined based on the received information.

* * * * *